(12) United States Patent
Zhang

(10) Patent No.: US 10,611,301 B2
(45) Date of Patent: Apr. 7, 2020

(54) SELF-ADJUSTING SPHERICAL SPEAKER

(71) Applicant: Yuyao Decheng Technology Consulting Co., Ltd., Yuyao, Zhejiang Province (CN)

(72) Inventor: Shanqin Zhang, Yuyao (CN)

(73) Assignee: YUYAO FEITE PLASTIC CO., LTD. (CN)

( * ) Notice: Subject to any disclaimer, the term of this patent is extended or adjusted under 35 U.S.C. 154(b) by 0 days.

(21) Appl. No.: 16/337,181

(22) PCT Filed: Jun. 30, 2017

(86) PCT No.: PCT/CN2017/091158
§ 371 (c)(1),
(2) Date: Mar. 27, 2019

(87) PCT Pub. No.: WO2018/223465
PCT Pub. Date: Dec. 13, 2018

(65) Prior Publication Data
US 2019/0225146 A1    Jul. 25, 2019

(30) Foreign Application Priority Data
Jun. 6, 2017    (CN) .......................... 2017 1 0419032

(51) Int. Cl.
*B60Q 1/00*     (2006.01)
*B60Q 5/00*     (2006.01)
(Continued)

(52) U.S. Cl.
CPC .............. *B60Q 5/005* (2013.01); *B60K 35/00* (2013.01); *B60Q 9/00* (2013.01); *G06T 7/50* (2017.01);
(Continued)

(58) Field of Classification Search
CPC .......... B60Q 5/005; B60Q 9/00; H04W 4/021; H04W 4/046; H04N 9/735; H04N 7/183;
(Continued)

(56) References Cited

U.S. PATENT DOCUMENTS 9,499,095 B1 * 11/2016 Buehler ................... B60Q 1/46
2002/0084891 A1 * 7/2002 Mankins .............. B60Q 1/2611
340/425.5

(Continued)

FOREIGN PATENT DOCUMENTS

CN          201333976 Y       10/2009
CN          202827860 U        3/2013
(Continued)

OTHER PUBLICATIONS

International Search Report and Written Opinion for correspnding international application No. PCT/CN2017/091158, dated Feb. 24, 2018.

*Primary Examiner* — Anh V La
(74) *Attorney, Agent, or Firm* — Tarolli, Sundheim, Covell & Tummino LLP

(57) ABSTRACT

A self-adjusting spherical speaker includes a remote control handle, a megaphone, a vibration sensor, an alarm, a spherical speaker body and a digital signal processor. The remote control handle is provided for issuing a manual control signal according to user's input; the digital signal processor controls a playing mode of the spherical speaker body according to the manual control signal; the vibration sensor is provided for detecting the amplitude of vibration of a police car body. If the digital signal processor determines that the amplitude of vibration of the police car body is greater than a predetermined vibration threshold, the alarm will be controlled to carry out an alarm operation, and the digital signal processor will convert a user's voice received by the megaphone into an electrical control signal to control (Continued)

the playing mode of the spherical speaker. Therefore, the operating mode of the spherical speaker can be self-adjusted.

4 Claims, 2 Drawing Sheets

(51) Int. Cl.
| | | |
|---|---|---|
| *H04R 27/04* | (2006.01) | |
| *B60K 35/00* | (2006.01) | |
| *H04N 7/18* | (2006.01) | |
| *G06T 7/50* | (2017.01) | |
| *H04N 9/73* | (2006.01) | |
| *B60Q 9/00* | (2006.01) | |
| *H04W 4/021* | (2018.01) | |
| *B60R 1/00* | (2006.01) | |

(52) U.S. Cl.
CPC ............ *H04N 7/183* (2013.01); *H04N 9/735* (2013.01); *H04R 27/04* (2013.01); *H04W 4/021* (2013.01); *B60K 2370/152* (2019.05); *B60K 2370/179* (2019.05); *B60R 1/00* (2013.01); *G06T 2207/30261* (2013.01)

(58) Field of Classification Search
CPC . G06T 7/50; G06T 2207/30261; B60K 35/00; B60K 2370/179; B60K 2370/152; H04R 27/04; B60R 1/00
USPC ......... 340/435, 436, 425.5, 463, 691.1, 692, 340/693.5
See application file for complete search history.

(56) References Cited

U.S. PATENT DOCUMENTS

2006/0109988 A1* 5/2006 Metcalf .................. H04S 3/002 381/104
2016/0269848 A1* 9/2016 Mitsufuji ................. H04S 7/30

FOREIGN PATENT DOCUMENTS

| CN | 104202579 A | 12/2014 |
|---|---|---|
| CN | 106231497 A | 12/2016 |
| KR | 20120015894 A | 2/2012 |

* cited by examiner

SELF-ADJUSTING SPHERICAL SPEAKER

RELATED APPLICATIONS

The present invention is a U.S. National Stage under 35 USC 371 patent application, claiming priority to Serial No. PCT/CN2017/091158, filed on 30 Jun. 2017; which claims priority of CN 201710419032.9, filed on 6 Jun. 2017, the entirety of both of which are incorporated herein by reference.

FIELD OF THE INVENTION

The present invention generally relates to the field of spherical speakers, and more particularly to a self-adjusting spherical speaker.

BACKGROUND OF THE INVENTION

There are various different types of speakers, which may be divided into electronic speakers (i.e. moving coil speakers), electrostatic speakers (i.e. capacitive speakers), electromagnetic speakers (i.e. reed type speakers) and piezoelectric speakers (i.e. transistor type speaker) according to the transduction principle, and the last two types of speakers described above are generally used in rural cable broadcasting networks. Speakers may also be divided into low-frequency speakers, mid-frequency speakers, and high-frequency speakers according to the frequency range, and these speakers are often used as a combination speaker in a speaker box.

According to the mechanism and structure of the transduction, speakers may be divided into moving coil speakers (electronic type), capacitive speakers (electrostatic type), piezoelectric speakers (transistor or ceramic type), electromagnetic speakers (compression spring type), electro-ionic speakers, and pneumatic speakers. The electric speakers with the advantages of good electroacoustic performance, firm structure and low cost have a wide range of application.

According to the sound radiation material, speakers may be divided into paper cones, horns, and diaphragms. According to the shape of paper cone, speakers may be divided into circular, elliptical, double paper-cone and rubber corrugated rim speakers. According to the operating frequency, speakers may be divided into low-frequency, mid-frequency, and high-frequency speakers, and some are divided into speakers specified for the use for answering machines, televisions, regular and high-fidelity. According to the voice coil impedance, speakers may be divided into low-impedance and high-impedance speakers. According to the sound effect, speakers may be divided into straight and surround sound speakers.

Speakers may also be divided into built-in speakers and external speakers, wherein the external speaker generally refers to a speaker box, and the built-in speaker generally refers to a speaker built into a MP4 player, so that users not just can listen to the sound played from the MP4 player through a headset only, but also through a built-in speaker. Therefore, a MP4 player having a built-in speaker no longer needs an external speaker box, and avoid the inconvenience caused by wearing the headset for a long time.

Since a conventional spherical speaker has a poor self-adjusting capability, the spherical speaker cannot confirm its playing mode according to the front car distance of the nearest car ahead in order to provide a reminding effect about a car in the front with different front car distances.

In view of the aforementioned drawbacks of the prior art, the inventor of the present invention based on years of experience in the related industry to conduct extensive research and experiment, and finally provided a feasible solution to overcome the drawbacks of the prior art.

SUMMARY OF THE INVENTION

Therefore, it is a primary objective of the present invention to overcome the aforementioned drawbacks of the prior art by providing a self-adjusting spherical speaker capable of obtaining a nearest car body image by carrying out a nearest car body identification of a front image to confirm a front car distance according to the depth of field of the nearest car body image in the front image, classifying the front car distance as a close range, a mid-distance range or a far range, and if the front car distance is classified as the close range, the spherical speaker body will be controlled and set to a three-sound speaker mode and a low sound frequency mode to play the content, and if the front car distance is classified as the mid-distance range, the spherical speaker body will be controlled and set to a five-sound speaker mode and a middle sound frequency mode to play the content, and if the front car distance is classified as the far range, the spherical speaker body will be controlled to be set to an eight-sound speaker mode and a high sound frequency mode to play the content.

To achieve the aforementioned objective, the present invention provides a self-adjusting spherical speaker comprising a remote control handle, a megaphone, a vibration sensor, an alarm, a spherical speaker body and a digital signal processor. Wherein, the digital signal processor is coupled to the remote control handle, the megaphone, the vibration sensor, the alarm and the spherical speaker body.

The remote control handle is provided for issuing a manual control signal according to a user's input; the digital signal processor controls a playing mode of the spherical speaker body according to the manual control signal; the vibration sensor is provided for detecting an amplitude of vibration of a police car body; and if the digital signal processor determines that the amplitude of vibration of the police car body is greater than a predetermined vibration threshold, the alarm will be controlled to carry out an alarm operation.

Wherein, the digital signal processor is further used for converting a user's voice received by the megaphone into an electrical control signal to control the playing content of the spherical speaker body More specifically, the self-adjusting spherical speaker further comprises a beam bracket mounted onto a roof of the police car and provided for fixing the spherical speaker body.

More specifically, the self-adjusting spherical speaker controlled by the digital signal processor has a middle sound frequency mode, a low sound frequency mode and a high sound frequency mode; wherein, the spherical speaker body plays the content in a fixed direction.

More specifically, the self-adjusting spherical speaker controlled by the digital signal processor has an eight-sound speaker mode, a five-sound speaker mode and a three-sound speaker mode.

More specifically, the self-adjusting spherical speaker further comprises:

a light intensity detector, installed onto the beam bracket, for detecting the illumination intensity around the police car to output a current light intensity. The light intensity change rate detector is coupled to the light intensity detector for detecting a change rate of the current light intensity, and if the change rate of the current light intensity is greater than or equal to a predetermined change rate threshold, then a too-high change rate signal will be issued, or else a normal change rate signal will be issued;

a self-adjusting sensor, embedded into the beam bracket, and coupled to the light intensity change rate detector, for carrying out an image data collection of a front scene of the police car to obtain and output a high-definition scene image, and the self-adjusting sensor comprising a graphic data reader and a pixel data obtaining device, and each pixel data obtaining device comprising a plurality of parallelly connected photoelectric conversion units, and if the normal change rate signal is received, then each pixel data obtaining device will use and output the data sensed by only one of the plurality of the parallel connected photoelectric conversion units, and if the too-high change rate signal is received, then each pixel data obtaining device will combine and output the data sensed by the plurality of parallelly connected photoelectric conversion unit, and the graphic data reader being coupled to each pixel data obtaining device, for reading the data outputted by each pixel data obtaining device and using the data as a pixel value of each pixel, and the pixel value of each pixel constituting the high-definition scene image;

a white balance processing device, coupled to the self-adjusting sensor, for receiving the high-definition scene image, and carrying out a white balance processing of the self-adjustment of the high-definition scene image to obtain a white balance image;

a parameter fetching device, coupled to the white balance processing device, for receiving the white balance image, and confirming a mean square error of the pixel value of the white balance image according to the pixel value of each pixel point of the white balance image and using the mean square error as the output of a target mean square error to carry out a noise analysis of the white balance image to obtain three main noise signals with the top three noise amplitudes, and confirming a signal-to-noise ratio of the white balance image according to three main noise signals and the white balance image and using the signal-to-noise ratio as the output of a target signal-to-noise ratio;

the digital signal processor being coupled to the parameter fetching device for receiving the target mean square error and the target signal-to-noise ratio, and if the target signal-to-noise ratio is smaller than or equal to a predetermined signal-to-noise ratio threshold and the target mean square error is greater than or equal to a predetermined mean square error threshold, then a fine filter signal will be issued, or else a rough filter signal will be issued;

a fine filter device, coupled to the digital signal processor, for triggering a fine filter device to carry out a filter operation of the white balance image when the fine filter signal is received, and the filter operation comprising the steps of carrying out a wavelet decomposition of the received white balance image to obtain LL, LH, HL and four HH subbands, confirming the mean of the HH subbands, calculating an optimal threshold of a wavelet contraction according to the mean, carrying out a wavelet reconstruction of the white balance image according to the optimal threshold of the wavelet contraction to obtain a filtered image outputted by the fine filter device;

a rough filter device, coupled to the digital signal processor, for triggering the rough filter device to carry out a filter operation of the white balance image when the rough filter signal is received, and the filter operation specifically comprising the steps of carrying out a linear filter processing of the white balance image to obtain a filtered image outputted by the rough filter device; and a car distance detecting device, coupled to the fine filter device and the rough filter device, for receiving a filtered image outputted by the fine filter device or the rough filter device to carry out a nearest car body identification of the filtered image to obtain a nearest car body image, and confirming the front car distance according to a depth of field of the nearest car body image in the filtered image;

wherein, the digital signal processor is coupled to the car distance detecting device for classifying the front car distance as a close range, a mid-distance range or a far range, and if the front car distance is classified as the close range, the digital signal processor will control the spherical speaker body to play a content in the three-sound speaker mode and the low sound frequency mode; if the front car distance is classified as the mid-distance range, the digital signal processor will control the spherical speaker body to play the content in the five-sound speaker mode and the middle sound frequency mode, and if the front car distance is classified as the far range, the digital signal processor will control the spherical speaker body to play the content in the eight-sound speaker mode and the high sound frequency mode.

In the self-adjusting spherical speaker, the white balance processing device, the parameter fetching device, the fine filter device and the rough filter device are implemented on different chips respectively.

The self-adjusting spherical speaker further comprises a liquid crystal display installed in a dashboard at the front end of the police car and coupled to the digital signal processor for instantly displaying the front car distance and instantly displaying the current operating mode of the spherical speaker body.

In the self-adjusting spherical speaker, the megaphone, the vibration sensor and the alarm are installed onto the beam bracket, and the digital signal processor is installed in a dashboard at the front end of the police car, and the remote control handle carries out a two-way communication with the digital signal processor installed in the dashboard at the front end of the police car through a wireless communication method.

DESCRIPTION OF THE PREFERRED EMBODIMENTS

Figure 1:
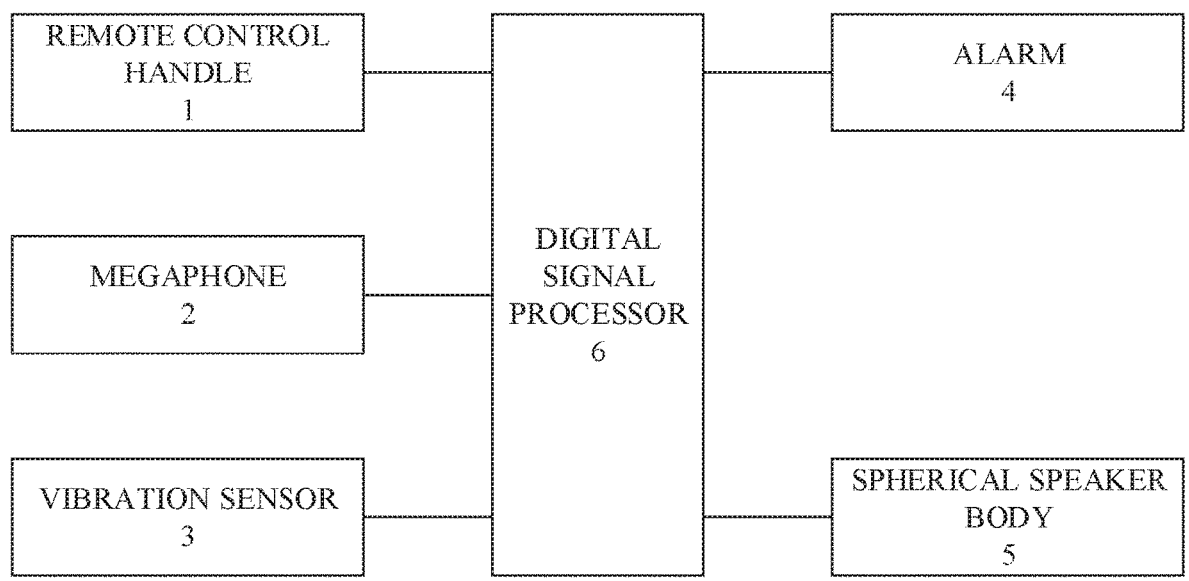
FIG. 1 is a structural block diagram of a self-adjusting spherical speaker in accordance with an embodiment of the present invention.

The technical contents of the present invention will become apparent with the detailed description of preferred embodiments accompanied with the illustration of related drawings as follows. It is intended that the embodiments and figures disclosed herein are to be considered illustrative rather than restrictive.

Of course, it preferably has a larger speaker, since a base speaker with a large diameter can perform better in the low-frequency section. A speaker box manufactured with a high-performance speaker implies a lower transient distortion and a better sound quality. Most of the general multimedia speaker boxes with a bass speaker have a size of 3-5 inches. A speaker box manufactured with a high-performance speaker implies a lower transient distortion and a better sound quality.

The most common speaker is the electric paper-cone speaker. The electric conical speaker is also known as the paper-cone speaker. Although diaphragm was still dominated by paper cone in 2014, many polymer diaphragms and metal diaphragms were used, and the name of conical speakers is just like its name. Most paper-cone speakers are comprised of three major parts, namely a magnetic circuit system (including permanent magnet, stem, and magnetic plate), a vibrating system (including paper cone and voice coil) and a support assisting system (including centering bracket, basin frame and cushioned edge).

1. Voice Coil: It is a driving unit of the paper-cone speaker. Fine copper wire is wound around a paper tube for two layers (generally tens of rounds), and thus the voice coil is also called "coil" and generally placed in a magnetic gap formed by the magnetic stem and the magnetic plate. The voice coil is fixed with the paper cone. After a sound current signal passes into the voice coil, the vibration of the voice coil will drive the paper cone to vibrate accordingly.

2. Paper Cone: The conical diaphragm of a paper-cone speaker is made of various materials such as natural fibers and artificial fibers. The natural fibers include cotton, wood, wool, silk, etc. The artificial fibers include rayon, nylon, fiberglass, etc. Since the paper cone is a sound radiating device of the speaker, it plays an important role in the sound performance of the speaker, and requires a light weight and a good rigidity regardless of which kind of paper cone. The paper cone cannot be deformed due to the factors of ambient temperature and humidity.

3. Folding Ring: It is a device provided for ensuring paper cone to move along the axial direction of the speaker and limiting its movement along transversal direction while providing the effect of blocking the air circulation at the front and back of the paper cone. The folding ring may be made of a material same as the paper cone, or any other material such as plastic or natural rubber thermally pressed and adhered onto the paper cone.

4. Centering Bracket: It is provided for supporting the joint of the voice coil and the paper cone to ensure its erected state without being tilted. The centering bracket has many concentric rings, so that the voice coil can move freely and vertically up and down in the magnetic gap without moving transversely and prevent the voice coil from hitting the magnetic plate. The centering bracket usually comes with a dust cover to prevent dust from falling into the magnetic gap and avoid producing abnormal sound of the speaker caused by the friction between the voice coil and dust.

The conventional spherical speaker cannot detect the front car distance timely and accurately, and thus cannot confirm its operating mode according to the front car distance. As a result, the car at the front cannot obtain the playing content of the spherical speaker. Therefore, the present invention provides a self-adjusting spherical speaker to overcome the aforementioned technical problem.

With reference to FIG. 1 for a structural block diagram of a self-adjusting spherical speaker in accordance with an embodiment of the present invention, the self-adjusting spherical speaker comprises a remote control handle 1, a megaphone 2, a vibration sensor 3, an alarm 4, a spherical speaker body 5 and a digital signal processor 6. Wherein, the digital signal processor 6 is coupled to the remote control handle 1, the megaphone 2, the vibration sensor 3, the alarm 4 and the spherical speaker body 5.

The remote control handle 1 is provided for issuing a manual control signal according to a user's input, and the digital signal processor 6 controls a playing mode of the spherical speaker body 5 according to the manual control signal, and the vibration sensor 3 is provided for detecting an amplitude of vibration of a police car body, and if the digital signal processor 6 determines that the amplitude of vibration of the police car body is greater than a predetermined vibration threshold, the alarm 4 will be controlled to carry out an alarm operation.

Wherein, the digital signal processor 6 will convert a user's voice received by the megaphone 2 into an electrical control signal to control a playing mode of the spherical speaker body 5.

The specific structure of the self-adjusting spherical speaker of the present invention will be described in details below.

The spherical speaker further comprises a beam bracket mounted onto a roof of the police car and provided for fixing the spherical speaker body.

In the spherical speaker, the spherical speaker body controlled by the digital signal processor has a middle sound frequency mode, a low sound frequency mode and a high sound frequency mode, and the spherical speaker body plays the content in a fixed direction.

In the spherical speaker, the spherical speaker body controlled by the digital signal processor has an eight-sound speaker mode, a five-sound speaker mode, and a three-sound speaker mode.

The spherical speaker further comprises the following elements:

A light intensity detector is installed onto the beam bracket for detecting the illumination intensity around the police car to output a current light intensity.

A light intensity change rate detector is coupled to the light intensity detector for detecting a change rate of the light intensity, and issuing a too-high change rate signal if the change rate of the current light intensity is greater than or equal to a predetermined change rate threshold, or else issuing a normal change rate signal.

A self-adjusting sensor is embedded into the beam bracket and coupled to the light intensity change rate detector for carrying out an image data collection of a front scene of the police car to obtain and output a high-definition scene image.

Figure 2:
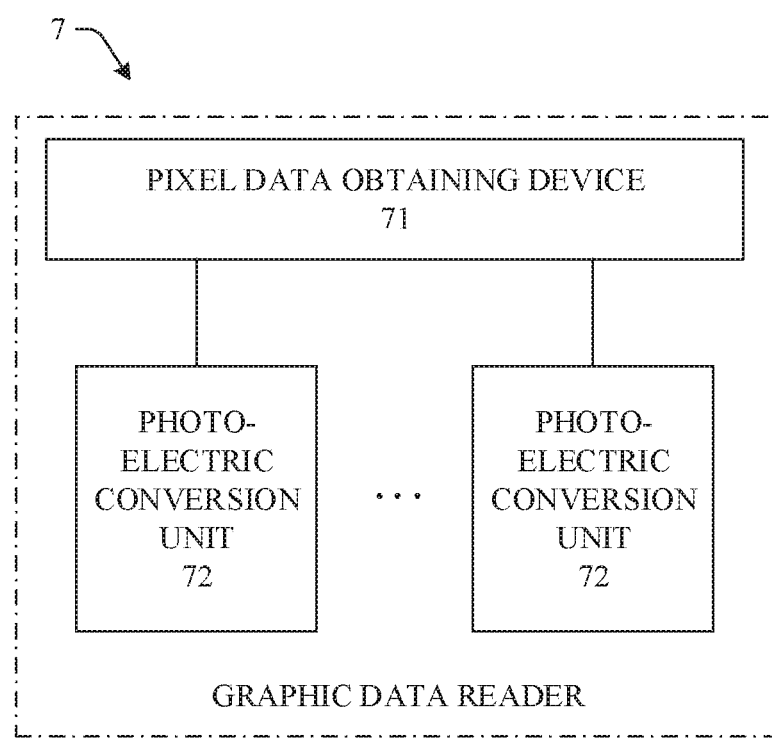
FIG. 2 is a structural block diagram of a self-adjusting sensor of a self-adjusting spherical speaker in accordance with an embodiment of the present invention.

In FIG. 2, the self-adjusting sensor comprises a graphic data reader 7 and a pixel data obtaining device 71, and each pixel data obtaining device 71 comprises a plurality of parallel connected photoelectric conversion units 72, and if the normal change rate signal is received, then each pixel data obtaining device 71 will use and output the data sensed by only one of the plurality of the parallel connected photoelectric conversion units 72, and if the too-high change rate signal is received, then each pixel data obtaining device 71 will combine and output the data sensed by the plurality of parallelly connected photoelectric conversion units 72, and the graphic data reader 7 is coupled to each pixel data obtaining device 71 and provided for reading the data outputted by each pixel data obtaining device 71 and using the data as a pixel value of each pixel, and the pixel value of each pixel constitutes the high-definition scene image A white balance processing device is coupled to the self-adjusting sensor for receiving the high-definition scene image, and carrying out a white balance processing of the self-adjustment of the high-definition scene image to obtain a white balance image.

A parameter fetching device is coupled to the white balance processing device for receiving the white balance image, and confirming a mean square error of the pixel value of the white balance image according to the pixel value of each pixel point of the white balance image and using the mean square error as the output of a target mean square error to carry out a noise analysis of the white balance image to obtain three main noise signals with the top three noise amplitudes, and confirming a signal-to-noise ratio of the white balance image according to three main noise signals and the white balance image and using the signal-to-noise ratio as the output of a target signal-to-noise ratio.

The digital signal processor is coupled to the parameter fetching device for receiving target mean square error and target signal-to-noise ratio, and if the target signal-to-noise ratio is smaller than or equal to a predetermined signal-to-noise ratio threshold and the target mean square error is greater than or equal to a predetermined mean square error threshold, then a fine filter signal will be issued, or else a rough filter signal will be issued A fine filter device is coupled to the digital signal processor for triggering a fine filter device to carry out a filter operation of the white balance image when the fine filter signal is received, and the filter operation comprises the steps of carrying out a wavelet decomposition of the received white balance image to obtain LL, LH, HL and four HH subbands, confirming the mean of the HH subbands, calculating an optimal threshold of a wavelet contraction according to the mean, carrying out a wavelet reconstruction of the white balance image according to the optimal threshold of the wavelet contraction to obtain a filtered image outputted by the fine filter device.

A rough filter device is coupled to the digital signal processor for triggering the rough filter device to carry out a filter operation of the white balance image when the rough filter signal is received, and the filter operation specifically comprises the steps of carrying out a linear filter processing of the white balance image to obtain a filtered image outputted by the rough filter device A car distance detecting device is coupled to the fine filter device and the rough filter device for receiving a filtered image outputted by the fine filter device or the rough filter device to carry out a nearest car body identification of the filtered image to obtain a nearest car body image, and confirming the front car distance according to a depth of field of the nearest car body image in the filtered image.

wherein, the digital signal processor is coupled to the car distance detecting device for classifying the front car distance as a close range, a mid-distance range or a far range, and if the front car distance is classified as the close range, the digital signal processor will control the spherical speaker body to play a content in the three-sound speaker mode and the low sound frequency mode; if the front car distance is classified as the mid-distance range, the digital signal processor will control the spherical speaker body to play the content in the five-sound speaker mode and the middle sound frequency mode, and if the front car distance is classified as the far range, the digital signal processor will control the spherical speaker body to play the content in the eight-sound speaker mode and the high sound frequency mode.

In the spherical speaker, the white balance processing device, the parameter fetching device, the fine filter device and the rough filter device are implemented on different chips respectively.

The spherical speaker further comprises a liquid crystal display installed in a dashboard at the front end of the police car and coupled to the digital signal processor for instantly displaying the front car distance and instantly displaying the current operating mode of the spherical speaker body.

In the spherical speaker, the megaphone, the vibration sensor and the alarm are installed onto the beam bracket, and the digital signal processor is installed in a dashboard at the front end of the police car, and the remote control handle carries out a two-way communication with the digital signal processor installed in the dashboard at the front end of the police car through a wireless communication method.

In addition, the structure of the DSP chip has the features of adopting a Harvard architecture that separates programs and data, using a specified hardware multiplier, broadly using a pipeline operation, providing special DSP commands, and carrying out different digital signal processing algorithms quickly.

To meet the digital signal processing requirements, the DSP chip generally has the following features: (1) Multiplication and addition can be completed once for every computing cycle. (2) Program and data spaces are separated, so that instructions and data can be visited simultaneously. (3) It contains quick RAM, so that two blocks can be visited simultaneously through independent data buses. (4) It provides hardware support with low-overhead or no-overhead loops and jumps. (5) It provides quick interrupt processing and hardware I/O support. (6) It has a plurality of hardware address generators operated in a single cycle. (7) It can carry out several operations simultaneously. (8) It supports pipeline operation, so that the fetch, decode, and execute operations can be carried out simultaneously.

The DSP chip may be divided according to the data format used for the operation. The DSP chip using a fixed-point data format is called a fixed-point DSP chip, such as the TMS320C1X/C2X, TMS320C2XX/C5X, and TMS320C54X/C62XX series of TI, the ADSP21XX series of AD, the DSP16/16A of AT&T, the MC56000 of Motorola, etc. The DSP chip using a floating-point data format is called a floating-point DSP chip such as the TMS320C3X/C4X/C8X series of TI, the ADSP21XXX series of AD, the DSP32/32C of AT&T, the MC96002 of Motorola, etc.

The floating-point data format adopted by different floating-point DSP chips may vary, and some DSP chips adopt a self-defined floating-point format such as the TMS320C3X, and some DSP chips adopts the IEEE floating-point format such as the MC96002 of Motorola, the MB86232 of FUJITSU, the ZR35325 of ZORAN, etc.

Compared with the conventional spherical speaker with a single operating mode, the self-adjusting spherical speaker of the present invention uses the presently existed hardware foundation to integrate and customize an image collection device and various image processing devices to obtain an accurate front car distance, flexibly confirming the corresponding operating mode of the spherical speaker according to the front car distance, so as to improve the self-adjustment capability of the spherical speaker.

While the present invention has been described by means of specific embodiments, numerous modifications and variations could be made thereto by those skilled in the art without departing from the scope and spirit of the present invention set forth in the claims.

What is claimed is:

1. A self-adjusting spherical speaker, comprising a remote control handle, a megaphone, a vibration sensor, an alarm, a spherical speaker body and a digital signal processor, characterized in that the digital signal processor is coupled to the remote control handle, the megaphone, the vibration sensor, the alarm and the spherical speaker body, and the remote control handle issues a corresponding manual control signal according to a user's input, and the digital signal processor controls a playing mode of the spherical speaker body according to the manual control signal, and the vibration sensor is provided for detecting an amplitude of vibration of a police car body, and if the digital signal processor determines that the amplitude of vibration of the police car body is greater than a predetermined vibration threshold, the alarm will be controlled to carry out an alarm operation, and the digital signal processor will convert a user's voice received by the megaphone into an electrical control signal to control a playing mode of the spherical speaker body;

a beam bracket mounted onto a roof of a police car for fixing the spherical speaker body;

the spherical speaker body controlled by the digital signal processor has a middle sound frequency mode, a low sound frequency mode and a high sound frequency mode, and the spherical speaker body plays the content in a fixed direction;

the spherical speaker body controlled by the digital signal processor has an eight-sound speaker mode, a five-sound speaker mode, and a three-sound speaker mode; and further comprising:

a light intensity detector installed onto the beam bracket for detecting an illumination intensity around the police car to output a current light intensity;

a light intensity change rate detector, coupled to the light intensity detector, for detecting a change rate of the light intensity, and issuing a too-high change rate signal if the change rate of the current light intensity is greater than or equal to a predetermined change rate threshold, or else issuing a normal change rate signal;

a self-adjusting sensor, embedded into the beam bracket, and coupled to the light intensity change rate detector, for carrying out an image data collection of a front scene of the police car to obtain and output a high-definition scene image;

the self-adjusting sensor, comprising a graphic data reader and a pixel data obtaining device, and each pixel data obtaining device comprising a plurality of parallelly connected photoelectric conversion units, and if the normal change rate signal is received, then each pixel data obtaining device will use and output the data sensed by only one of the plurality of the parallel connected photoelectric conversion units, and if the too-high change rate signal is received, then each pixel data obtaining device will combine and output the data sensed by the plurality of parallelly connected photoelectric conversion unit, and the graphic data reader being coupled to each pixel data obtaining device, for reading the data outputted by each pixel data obtaining device and using the data as a pixel value of each pixel, and the pixel value of each pixel constituting the high-definition scene image;

a white balance processing device, coupled to the self-adjusting sensor, for receiving the high-definition scene image, and carrying out a white balance processing of the self-adjustment of the high-definition scene image to obtain a white balance image;

a parameter fetching device, coupled to the white balance processing device, for receiving the white balance image, and confirming a mean square error of the pixel value of the white balance image according to the pixel value of each pixel point of the white balance image and using the mean square error as the output of a target mean square error to carry out a noise analysis of the white balance image to obtain three main noise signals with the top three noise amplitudes, and confirming a signal-to-noise ratio of the white balance image according to three main noise signals and the white balance image and using the signal-to-noise ratio as the output of a target signal-to-noise ratio;

the digital signal processor being coupled to the parameter fetching device for receiving the target mean square error and the target signal-to-noise ratio, and if the target signal-to-noise ratio is smaller than or equal to a predetermined signal-to-noise ratio threshold and the target mean square error is greater than or equal to a predetermined mean square error threshold, then a fine filter signal will be issued, or else a rough filter signal will be issued;

a fine filter device, coupled to the digital signal processor, for triggering a fine filter device to carry out a filter operation of the white balance image when the fine filter signal is received, and the filter operation comprising the steps of carrying out a wavelet decomposition of the received white balance image to obtain LL, LH, HL and four HH subbands, confirming the mean of the HH subbands, calculating an optimal threshold of a wavelet contraction according to the mean, carrying out a wavelet reconstruction of the white balance image according to the optimal threshold of the wavelet contraction to obtain a filtered image outputted by the fine filter device;

a rough filter device, coupled to the digital signal processor, for triggering the rough filter device to carry out a filter operation of the white balance image when the rough filter signal is received, and the filter operation specifically comprising the steps of carrying out a linear filter processing of the white balance image to obtain a filtered image outputted by the rough filter device;

a car distance detecting device, coupled to the fine filter device and the rough filter device, for receiving a filtered image outputted by the fine filter device or the rough filter device to carry out a nearest car body identification of the filtered image to obtain a nearest car body image, and confirming the front car distance according to a depth of field of the nearest car body image in the filtered image;

wherein, the digital signal processor is coupled to the car distance detecting device for classifying the front car distance as a close range, a mid-distance range or a far range, and if the front car distance is classified as the close range, the digital signal processor will control the spherical speaker body to play a content in the three-sound speaker mode and the low sound frequency mode; if the front car distance is classified as the mid-distance range, the digital signal processor will control the spherical speaker body to play the content in the five-sound speaker mode and the middle sound frequency mode, and if the front car distance is classified as the far range, the digital signal processor will control the spherical speaker body to play the content in the eight-sound speaker mode and the high sound frequency mode.

2. The self-adjusting spherical speaker of claim 1, wherein the white balance processing device, the parameter fetching device, the fine filter device and the rough filter device are implemented on different chips respectively.

3. The self-adjusting spherical speaker of claim 2, further comprising a liquid crystal display installed in a dashboard at the front end of the police car and coupled to the digital signal processor for instantly displaying the front car distance and instantly displaying the current operating mode of the spherical speaker body.

4. The self-adjusting spherical speaker according to claim 1, wherein the megaphone, the vibration sensor and the alarm are installed onto the beam bracket, and the digital signal processor is installed in a dashboard at the front end of the police car, and the remote control handle carries out a two-way communication with the digital signal processor installed in the dashboard at the front end of the police car through a wireless communication method.

* * * * *